(12) United States Patent  (10) Patent No.: US 7,456,715 B2
Fukada  (45) Date of Patent: Nov. 25, 2008

(54) MAGNETIC ENCODER AND WHEEL SUPPORT BEARING ASSEMBLY UTILIZING THE SAME

(75) Inventor: Kikuo Fukada, Iwata (JP)

(73) Assignee: NTN Corporation, Osaka (JP)

( * ) Notice: Subject to any disclaimer, the term of this patent is extended or adjusted under 35 U.S.C. 154(b) by 360 days.

(21) Appl. No.: 11/119,716

(22) Filed: May 3, 2005

(65) Prior Publication Data

US 2005/0254986 A1    Nov. 17, 2005

(30) Foreign Application Priority Data

May 12, 2004 (JP) ............... 2004-141840
Aug. 24, 2004 (JP) ............... 2004-243133
Aug. 30, 2004 (JP) ............... 2004-250388

(51) Int. Cl.
    *H01F 7/02* (2006.01)
(52) U.S. Cl. ........................................ 335/302
(58) Field of Classification Search ......... 335/302–306; 384/448, 446; 324/207.25
    See application file for complete search history.

(56) References Cited

U.S. PATENT DOCUMENTS

2003/0059139 A1*  3/2003  Nakajima ................... 384/448

OTHER PUBLICATIONS

Hideo Mizuto, Patent Abstracts of Japan, "Bearing Seal Having Rotation Detecting Device", Publication No. 05-238369, Publication Date: Sep. 17, 1993.
Tatsuo Nakajima, et al., Patent Abstracts of Japan,"Magnetic Encoder and Wheel Bearing Provided With Encoder", Publication No. 2004-084925 and Publication Date: Mar. 18, 2004.

* cited by examiner

*Primary Examiner*—Ramon M Barrera

(57) ABSTRACT

There is provided in accordance with the present invention a magnetic encoder (10) including a ring-shaped multipolar magnet (14) having a plurality of opposite magnetic poles alternating with each other in a direction circumferentially thereof, and a core metal (11) for supporting the multipolar magnet (14). The multipolar magnet (14) is prepared from a sintered element that is formed by molding under pressure a powdery mixture of a powdery magnetic material and a binder containing a powdery non-magnetic metallic material to provide a green compact and then sintering the green compact to provide the sintered element. The green compact is molded by the application of a molding force of not lower than 65 tons and the binder has a particle size smaller than 40 µm. The sintered element has a density preferably not smaller than 6.6 $g/cm^3$.

13 Claims, 9 Drawing Sheets

MAGNETIC ENCODER AND WHEEL SUPPORT BEARING ASSEMBLY UTILIZING THE SAME

BACKGROUND OF THE INVENTION

1. Field of the Invention

The present invention relates to a magnetic encoder for use in a rotation detecting device for detecting the number of revolutions of a rotating element of a bearing relative to a non-rotating element thereof and also to a wheel support bearing assembly utilizing such magnetic encoder. More specifically, the present invention relates to the magnetic encoder used as a component of a bearing sealing unit mounted on a rotation detecting device that is employed in association with, for example, an automobile anti-skid brake control system for detecting respective numbers of revolutions of automobile front and rear wheels and also to the wheel support bearing assembly utilizing such magnetic encoder.

2. Description of the Prior Art

The rotation detecting device for use in association with the anti-skid brake control system for minimizing skidding of an automotive vehicle on a road surface has hitherto been assembled in a number of structures. Of them, the following structure is largely employed in practice. Specifically, the conventional rotation detecting device includes a serrated rotor and a detecting sensor, which are arranged spaced a distance from each other outside a sealing device used to seal the bearing, but are functionally integrated together to define a single and independent rotation detecting device.

This conventional rotation detecting device is of a design, in which the detecting sensor secured to a knuckle can detect the number of revolutions of the serrated rotor mounted on a rotary shaft for rotation together therewith. The bearing assembly utilizing such rotation detecting device is protected from ingress of water components and/or any other foreign matters by means of the independent sealing device positioned laterally of the rotation detecting device.

Another conventional rotation detecting device is also known, which is designed to form a part of a bearing sealing device for the purpose of increase of detecting performance and reduction of the space for installation of the rotation detecting device. As shown in FIGS. 17A and 17B, this rotation detecting device for the detection of the wheel revolution includes a magnetic encoder 50 having a multipolar rubber magnet 60. This magnetic encoder 50 is formed by vulcanizing an elastic member (rubber material) mixed with a powdery magnetic material, molding the vulcanized elastic member to represent an annular shape, bonding the annular elastic member to a generally annular slinger 61 employed in the rotation detecting device and finally magnetizing the bonded annular elastic member to have a plurality of circumferentially alternating opposite magnetic poles. See, for example, the Japanese Patent No. 2816783.

A further conventional rotation detecting device is suggested in, for example, the Japanese Laid-open Patent Publication No. 2004-084925, in which an annular multipolar magnet having a plurality of circumferentially alternating opposite magnetic poles formed therein is supported by a core metal to form a magnetic encoder. In this conventional rotation detecting device, the multipolar magnet is made of a sintered element formed by sintering a mixture of a powdery magnetic material and a binder of a powdery non-magnetic metallic material.

The magnetic encoder made of the sintered element can contain a large proportion of the powdery magnetic material as compared with that in the prior art rubber magnet and can also have a high magnetic force per unitary volume, and accordingly, not only can the detecting sensitivity be increased, but also the magnetic encoder can have a thin-walled structure. Also, as compared with the magnetic member prepared by sintering only the powdery magnetic material, cracking would hardly occur because of the presence of the powdery non-magnetic metallic material used as the binder. In addition, since the surface hardness of the multipolar magnet prepared from the sintered element is so high, as compared with that exhibited by the rubber magnet, that the multipolar magnet is hardly damaged, resulting in increase of the durability and the reliability.

According to the second mentioned patent literature, the multipolar magnet is formed by fixing the sintered element to the core metal or the slinger by means of a staking technique and then magnetizing the sintered element to have a plurality of circumferentially alternating opposite magnetic poles. In general, however, as a method of magnetizing the elastic member to form the multipolar rubber magnet 60 disclosed in the first mentioned patent literature or magnetizing the sintered element to form the multipolar magnet disclosed in the second mentioned patent literature, either one of one-shot magnetization process and index magnetization process is employed. Also, for the powdery magnetic material, a powdery ferrite material or a powdery mixture of samarium and neodymium materials is generally employed.

In the case of the magnetic encoder of the structure in which the rubber magnet is bonded to the slinger such as disclosed in the first mentioned patent literature, the elastic member must have an increased wall thickness if the magnetic flux density is desired to be increased, and since the space available in the vicinity of the magnetic encoder is limited, it is often encountered with difficulty in designing. Also, a problem has been found that collision with small gravel stones results in damages to the surface of the elastic member, accompanied by degradation of the magnetic characteristic such as reduction in magnetic flux density and increase of the pitch error to such an extent as to result in deterioration of the sensing function.

On the other hand, in the case of the magnetic encoder of the structure in which the multipolar magnet supported by the core metal is prepared from the sintered element such as disclosed in the second mentioned patent literature, not only can increase in sensitivity and reduction in wall thickness be accomplished, but also the surface hardness is high enough to avoid damage. The presence of the powdery non-magnetic metallic material used as the binder renders cracking or breaking to occur relatively hardly. However, the prevention of cracking is still insufficient and, when the magnetic encoder is press-fitted onto an inner race of a wheel support bearing, cracking tends to occur in the multipolar magnet unless careful handling is exercised. Once crack damage occurs in the multipolar magnet, rusting may occur and the pitch precision may decrease, resulting in a high risk of the sensing function being reduced.

The magnetization process will be discussed in more detail. Where the multipolar magnet 60 of the magnetic encoder 50 of FIGS. 17A and 17B disclosed in the first mentioned patent literature is magnetized by one-shot magnetization, such magnetization is carried out while as shown in FIG. 18, a multipolar magnet material (elastic member) 60A bonded by vulcanization to the slinger 61 is overlapped on magnetizing surface areas 44 formed so as to be deployed over a surface of a ring-shaped magnetizing yoke 42. At this time, when an electric current is supplied to a coil which is wound so as to surround the magnetizing surface areas 44, a magnetic field is developed to magnetize the multipolar magnet material 60A to form the multipolar magnet 60 as shown in FIG. 17A.

In such case, the slinger 61 is of a shape including a cylindrical wall 61a and a radial upright wall 61b protruding radially outwardly from one end of the cylindrical wall 61a. The multipolar magnet material 60A is positioned on one of the circumferential surfaces of the radial upright wall 61b opposite to the cylindrical wall 61a and, accordingly, the cylindrical wall 61a of the slinger 61 will not disturb the one-shot magnetization, as shown in FIG. 18. However, in this magnetic encoder 50, the sum of the width of the cylindrical wall 61a and the width of the multipolar magnet 60 represents the width of the magnetic encoder 50 itself, involving a problem associated with increase of the width.

If in order to alleviate the problem discussed above, the cylindrical wall is formed so as to protrude in the reverse direction as shown by 61aa in FIG. 17B, that is, the multipolar magnet 60 is positioned on one of the circumferential surfaces of the radial upright wall 61b adjacent the cylindrical wall 61aa, the width of the magnetic encoder 50 can be reduced by a quantity corresponding to the width of the multipolar magnet 60. However, in such case, as shown in FIG. 18, the cylindrical wall 61aa of the slinger 61 will disturb the one-shot magnetization with the multipolar magnet material 60A consequently failing to contact the magnetizing surface areas 44 of the magnetizing yoke 42.

Also, if the cylindrical wall 61aa is positioned along an inner peripheral surface (inner diameter surface) of the magnetizing yoke 42 in an attempt to render the multipolar magnet material 60A to contact the magnetizing surface areas 44, a portion of the multipolar magnet material 60A will depart from the magnetizing surface areas 44. On the other hand, if the length of the multipolar magnet material 60A is reduced to allow the multipolar magnet material 60A in its entirety to be overlapped over the magnetizing surface areas 44, there is a risk that no predetermined magnetic characteristic can be obtained at a required location of the magnet material 60A.

The foregoing problems may be substantially eliminated if the multipolar magnet material 60A is magnetized by index magnetization process. In such case, regardless of the shape of the slinger 61, the multipolar magnet material 60A can be magnetized satisfactorily. However, the use of the index magnetization process will pose the following problems depending on the kind of magnetic material used:

(1) Where ferrite is used as the magnetic material, the magnetization can be achieved, but the multipolar magnet 60 must have an increased wall thickness in order to increase the magnetic flux density, resulting in difficulty in installing the resultant magnetic encoder depending on the space available in the vicinity of where it must be disposed.

(2) Where a rare earth metal such as samarium and neodymium is employed as the magnetic material, extremely strong magnetic field must be developed to magnetize it since the rare earth metal has a high coercive force. With the index magnetization, it is not possible to develop the required quantity of magnetic field and, therefore, no satisfactorily magnetization can be achieved.

SUMMARY OF THE INVENTION

In view of the foregoing, the present invention has for its primary object to provide an improved magnetic encoder, which, as a result of use of a sintered element for a multipolar magnet, can be manufactured in a thin-walled structure, has a high detecting sensitivity and is less susceptible to damage, and which is effective to avoid cracking even though the careful handling is not exercised for press-fitting the magnetic encoder, thereby preventing rusting, maintaining the pitch precision and, hence, achieving the highly accurate detection of the numbers of revolutions.

Another important object of the present invention is to provide the magnetic encoder having the multipolar magnet that can be easily magnetized and manufactured in a compact structure.

A further important object of the present invention is to provide a wheel support bearing assembly utilizing the magnetic encoder.

In order to accomplish these objects of the present invention, there is provided a magnetic encoder including a ring-shaped multipolar magnet having a plurality of opposite magnetic poles alternating with each other in a direction circumferentially thereof, and a core metal for supporting the multipolar magnet. The multipolar magnet is prepared from a sintered element, which is formed by molding under pressure a powdery mixture of a powdery magnetic material and a binder comprising a powdery non-magnetic metallic material to provide a green compact and then sintering the green compact, and has at least one of the following elements (A) to (C):

(A) The green compact is molded by the application of a molding force of not lower than 65 tons and the binder has a particle size smaller than 40 μm.

(B) The binder has a particle size smaller than 40 μm and the sintered element has the density not smaller than 6.6 g/cm$^3$.

(C) Where an air gap x (mm) relative to a surface of the multipolar magnet is equal to or larger than 0.5, the relation between the air gap x and the magnetic flux density y (mT) of the multipolar magnet satisfies the formula, $210\ e^{-1.5x} < y < 320\ e^{-1.5x}$.

In the practice of the present invention, the sintered element containing the non-magnetic metallic material as the binder is utilized for the multipolar magnet and, therefore, as compared with the rubber magnet, reduction in wall thickness, increase of the sensitivity and minimized susceptibleness to surface damages can advantageously be obtained. The use of the sintered element renders the critical interference or the allowable maximum interference, when the magnetic encoder is to be press-fitted into the wheel support bearing assembly, to be severe as compared with that in the rubber magnet. However, when the multipolar magnet is formed to have the element (A), the critical interference can be increased as compared with that exhibited by the conventional sintered element and, therefore, the handling becomes easy since an undesirable occurrence of cracking or breaking in the multipolar magnet, which would otherwise occur when the magnetic encoder is press-fitted into the wheel support bearing assembly, can advantageously be avoided. For this reason, since rusting which would otherwise result from cracking can advantageously be avoided, which in turn brings about an advantage that the pitch precision of the magnetic encoder can be maintained, the magnetic encoder having the element (A) enables a highly accurate and reliable detection of the number of revolutions.

If the multipolar magnet has the structural feature (B), as is the case with the structural feature (A), not only can reduction in wall thickness, increase of the sensitivity and minimized susceptibleness to surface damages be obtained advantageously, but also the critical interference can be increased, as compared with that exhibited by the conventional sintered element and, therefore, the handling becomes easy since cracking or breaking in the multipolar magnet, which would otherwise occur when the magnetic encoder is press-fitted into the wheel support bearing assembly, can advantageously be avoided. For this reason, since rusting which would otherwise result from cracking can advantageously be avoided, which in turn brings about an advantage that the pitch precision of the magnetic encoder can be maintained, the magnetic encoder having the element (B) enables a highly accurate and reliable detection of the number of revolutions.

Also, if the multipolar magnet has the element (C), as compared with that exhibited by the conventional sintered element, the critical interference can be increased, and cracking or breaking in the multipolar magnet, which would otherwise occur when the magnetic encoder is press-fitted into the wheel support bearing assembly, can also be avoided, resulting in reduction in wall thickness, increase of the sensitivity and minimized susceptibleness to surface damages.

In the magnetic encoder utilizing the multipolar magnet prepared from the sintered element made of the powdery mixture referred to above, the higher the magnetic flux density, the better. However, if the magnetic flux density y (mT) exceeds $350\ e^{-1.5x}$, the proportion of the powdery magnetic material in the powdery mixture will be high, rendering the proportion of the binder in the powdery mixture to be insufficient and, therefore, there is the possibility that when the magnetic encoder is press-fitted into, for example, a bearing, cracking of the magnet will occur. On the other hand, if the magnetic flux density y (mT) is lower than $210\ e^{-1.5x}$, the high magnetic flux density, which is a merit of the sintered element, can no longer be obtained and will become comparable to that exhibited by the rubber magnet.

The multipolar magnet may have the structural features (A) and (B), that is, the multipolar magnet may have the density of the sintered element that is not smaller than 6.6 g/cm$^3$, where the molding force employed during the molding of the green compact is not lower than 65 tons and the binder has a particle size smaller than 40 μm.

According to this feature, the critical interference can further be increased, and the handling becomes further easy since cracking or breaking in the multipolar magnet, which would otherwise occur when the magnetic encoder is press-fitted into the wheel support bearing assembly, can advantageously be avoided.

Alternatively, the multipolar magnet may have the elements (A) and (C) or the elements (B) and (C). In other words, the multipolar magnet may be of a structure, in which the element (C), in which the relation between the air gap x (mm) and the magnetic flux density y (mT) is defined, is applied to any one of the element (A), in which the molding force and the range of the particle size of the binder are defined, and the element (B), in which the particle size of the binder and the range of the density of the sintered element are defined.

In the practice of the present invention, where the multipolar magnet has one of the elements (A) and (B), the particle size of the binder may be preferably not greater than 40 μm and, more preferably, not greater than 20 μm.

The smaller the particle size of the binder, the more excellent in function to bind particles of the powdery magnetic material together, and therefore the critical interference can further be increased. For this reason, the handling becomes easy since cracking or breaking in the multipolar magnet, which would otherwise occur when the magnetic encoder is press-fitted into the wheel support bearing assembly, can advantageously be avoided.

In a preferred embodiment of the present invention, the mixing ratio of the powdery magnetic material relative to the binder is chosen to be within the range of 55:45 to 80:20.

If the amount of the binder exceeds the uppermost limit relative to that of the powdery magnetic material, it means that the amount of the powdery magnetic material is so insufficient that no sufficient magnetic force can be obtained, resulting in difficulty in increasing the sensitivity. On the other hand, if the amount of the binder decreases below the lowermost limit relative to that of the powdery magnetic material, no sufficient function of the binder to bind the particles of the powdery magnetic material can be obtained, resulting in insufficient prevention of cracking which would otherwise occur during the press-fitting work.

The mixing ratio of the powdery magnetic material relative to the binder within the range of 55:45 to 80:20 is effective in that for a given size of the air gap between a multipolar magnet of a magnetic encoder and a magnetic sensor disposed in face-to-face relation with the multipolar magnet, the magnetic flux density in the multipolar magnet of the present invention can increase as compared with that of the conventional rubber magnet, and the size of the air gap required to obtain the same magnetic flux density can increase in the multipolar magnet of the present invention as compared with that with the use of the conventional rubber magnet. For this reason, the critical detection value or the minimum detectable value of the magnetic sensor used in combination with the magnetic encoder of the present invention can be increased as compared with that of the magnetic sensor used in combination with the conventional rubber magnet, resulting in reduction of the cost of the magnetic sensor. Also, since the air gap between the magnetic encoder and the magnetic sensor can be increased, the freedom of design of the surroundings of the rotation detection device having the magnetic encoder and the sensor can advantageously be increased. Cracking of the multipolar magnet, which would otherwise occur during the press-fitting work, will hardly occur as compared with that in the magnetic encoder utilizing the conventional sintered magnet.

In view of the balance to be taken between increase of the magnetic flux intensity and prevention of cracking during the press-fitting work, the most preferred mixing ratio of the powdery magnetic material relative to the binder lies approximately within the range of 70:30.

Where the multipolar magnet has the structural feature (C), the relation between the air gap x and the magnetic flux density y (mT) preferably satisfies the formula, $250\ e^{-1.5x}<y<320\ e^{-1.5x}$. If the magnetic flux density y is $250\ e^{-1.5x}$, further reduction in wall thickness and further increase of the sensitivity can be accomplished.

In another preferred embodiment of the present invention, a rust preventive coating may be formed over an entire surface of the magnetic encoder. This rust preventive coating may be formed by means of a cationic coating technique and may have a film thickness within the range of 15 to 35 μm.

The use of the rust preventive coating formed by means of the cationic coating technique is effective to avoid corrosion of the magnetic encoder, hence deterioration of magnetic characteristic even when the latter is wetted with saline mud water. The film thickness of the rust preventive coating smaller than 15 μm is not recommended in terms of rust preventive function. Also, if the rust preventive coating formed by means of the cationic coating technique is employed, in view of the fact that the coating is susceptible to elastic deformation as compared with the sintered element, the critical interference can be improved and a relatively large safety factor relative to the design interference can be anticipated. Although for these reason the relatively great film thickness is preferred, the film thickness in excess of 35 μm will be difficult to achieve with the cationic coating process since the latter is a kind of electrodeposition coating. Accordingly, the film thickness of the rust preventive coating is more preferably within the range of 30 to 35 μm.

The present invention in accordance with another aspect thereof also provides a method of making a magnetic encoder comprising a ring-shaped multipolar magnet having a plurality of opposite magnetic poles alternating with each other in a direction circumferentially thereof, and a core metal for supporting the multipolar magnet. This method includes making the multipolar magnet by molding a powdery mixture of a powdery magnetic material and a binder, comprising a powdery non-magnetic metallic material and having a particle size smaller than 40 μm, by the application of a molding force of not lower than 65 tons to provide a green compact, sintering the green compact to provide a sintered element, and magnetizing the sintered element to thereby complete the multipolar magnet.

According to this aspect of the present invention, not only can the critical interference be larger than that with the conventional sintered magnet, but the handling becomes easy since an undesirable occurrence of cracking or breaking in the multipolar magnet, which would otherwise occur when the magnetic encoder is press-fitted into the wheel support bearing assembly, can advantageously be avoided.

The present invention in accordance with a further aspect thereof provides a wheel support bearing assembly equipped with the magnetic encoder of the kind discussed hereinabove.

As is well known to those skilled in the art, the wheel support bearing is used under the severe environment of the road surface full of dust, gravel stones, saline mud water and/or temperature change. Also, the space for installation of a rotation detecting device is very limited in the bearing and, on the other hand, a precise detection of the number of revolutions is desired for in order to achieve a comfortable and safe movement of an automotive vehicle. For this reason, the use of the sintered element for the multipolar magnet employed in the magnetic encoder of the present invention is effective to accomplish reduction in wall thickness, increase of the sensitivity and minimized susceptibleness to surface damages and, at the same time, not only can cracking or breaking, which would otherwise occur during the press-fitting work as is often found with the conventional sintered element, be avoided, but the highly accurate detection of the number of revolutions as a result of avoidance of the rust and maintenance of the pitch precision can also be accomplished.

The wheel support bearing assembly referred to above may be of a type for rotatably supporting a vehicle wheel relative to a vehicle body structure and which includes an outer member having an inner peripheral surface formed with a plurality of outer raceways, an inner member having an outer peripheral surface formed with inner raceways aligned with the outer raceways, and respective rows of rolling elements interposed between the outer raceways and the inner raceways. In this wheel support bearing assembly, a sealing device operable to seal an annular bearing space delimited between the outer member and the inner member is employed. The sealing device may include a generally L-sectioned first sealing plate, mounted on one of the outer and inner members which serves as a rotatable member, and a generally L-sectioned second sealing plate, mounted on the other of the outer and inner members, which serves as a stationary member, in cooperative relation with the first sealing plate. An elastic member may be fitted to the second sealing plate and having a plurality of sealing lips slidingly engageable with the first sealing plate. In this wheel support bearing assembly, the first sealing plate forms a core metal of the magnetic encoder, which has a radial upright wall on which the multipolar magnet is disposed in overlapped relation therewith.

In the case of the wheel support bearing assembly of the structure described above, allowing the sealing lips of the elastic member to slidingly engage the L-sectioned first sealing plate provides excellent water proofing and rust preventing properties. Since the first sealing plate concurrently serves as the core metal of the magnetic encoder that is employed in the practice of the present invention, reduction in number of component parts used, minimization of the space and compactness of the magnetic encoder can be achieved in the present invention and, hence, the rotation detecting device can be employed in compact structure. Also, since the pitch precision of the multipolar magnet in the magnetic encoder can be maintained and it is possible to avoid degradation of the magnetic characteristic due to rusts as a result of cracking, the detecting accuracy of the rotation detecting device for detecting the number of revolutions of the vehicle wheel can advantageously be increased.

In one preferred embodiment of the present invention, the core metal may be of a shape including a cylindrical wall and a radial upright wall extending radially outwardly from one end of the cylindrical wall, in which case the multipolar magnet is positioned on one of opposite surfaces of the radial upright wall adjacent the cylindrical wall.

According to this feature, the widthwise portion of the multipolar magnet can be accommodated within the width of the cylindrical wall of the core metal with the overall width reduced consequently and, therefore, the magnetic encoder can be manufactured in a compact size.

In one preferred embodiment of the present invention, the multipolar magnet may be capable of being magnetized over the entire surface thereof while having not yet been secured to the core metal. In such case, regardless of the shape of the core metal, the multipolar magnet can be formed by means of one-shot magnetization process and, therefore, the magnetic encoder can easily be manufactured.

Where the multipolar magnet is magnetized by one-shot magnetization process, in which the multipolar magnet is magnetized all at a time over the entire surface thereof. Since no index magnetization is relied on, a material for the multipolar magnet, which contains the magnetic material of any kind such as ferrite, samarium or neodymium can be magnetized and, therefore, the freedom of design of the magnetic encoder is high.

According to the present invention, the magnetic encoder of the type, in which the multipolar magnet is positioned on one of the opposite surfaces of the radial upright wall adjacent the cylindrical wall to reduce the overall width of the magnetic encoder may be employed in the wheel support bearing assembly.

Since the magnetic encoder has a reduced width, the axial length of the bearing assembly need not be increased for accommodating the magnetic encoder.

According to a still further aspect of the present invention, there is provided a wheel support bearing assembly for rotatably supporting a wheel relative to a vehicle body structure, which includes an outer member having an inner peripheral surface formed with a plurality of outer raceways, an inner member having inner raceways aligned with the outer raceways, and respective rows of rolling elements interposed between the outer raceways and the inner raceways. In this wheel support bearing assembly, the magnetic encoder of the type, in which the multipolar magnet is positioned on one of the opposite surfaces of the radial upright wall adjacent the cylindrical wall to reduce the overall width of the magnetic encoder may be employed. In such case, the magnetic encoder is mounted on an outer periphery of an inboard end of the inner member through the cylindrical wall of the core metal, with the multipolar magnet oriented towards an inboard side.

According to this aspect of the present invention, since though the magnetic encoder has a reduced width, the width of the cylindrical wall, which is mounted on the outer periphery of the inner member, has a width that cannot be reduced, a sufficient mounting strength for mounting the encoder to the inner member can be secured through the cylindrical wall. For this reason, while a sufficient mounting width for the magnetic encoder can be secured, the inner member can be designed to have a reduced axial length, resulting in reduction in weight of the wheel support bearing assembly.

Also, considering that the magnetic encoder is fixed in position with the multipolar magnet oriented towards the inboard side, the multipolar magnet can be arranged within the annular bearing space, delimited between the inner and outer members, at a location generally intermediate of the length of the bearing space, with no need to increase the axial length of the inboard end of the annular bearing space and, therefore, the rotation detecting device can be structured in a compact size by disposing the magnetic sensor, which confronts the multipolar magnet, so as to ingress the annular bearing space.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
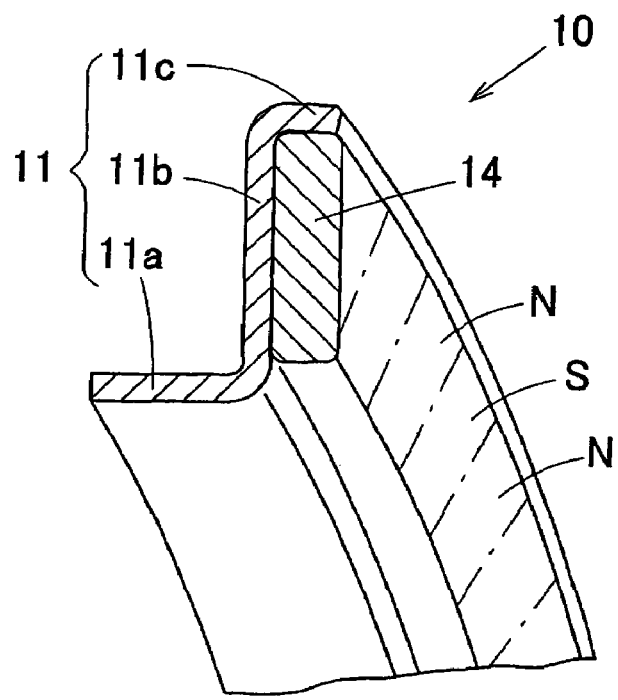
FIG. 1 is a fragmentary perspective view showing a portion of a magnetic encoder according to a first preferred embodiment of the present invention.
Figure 2:
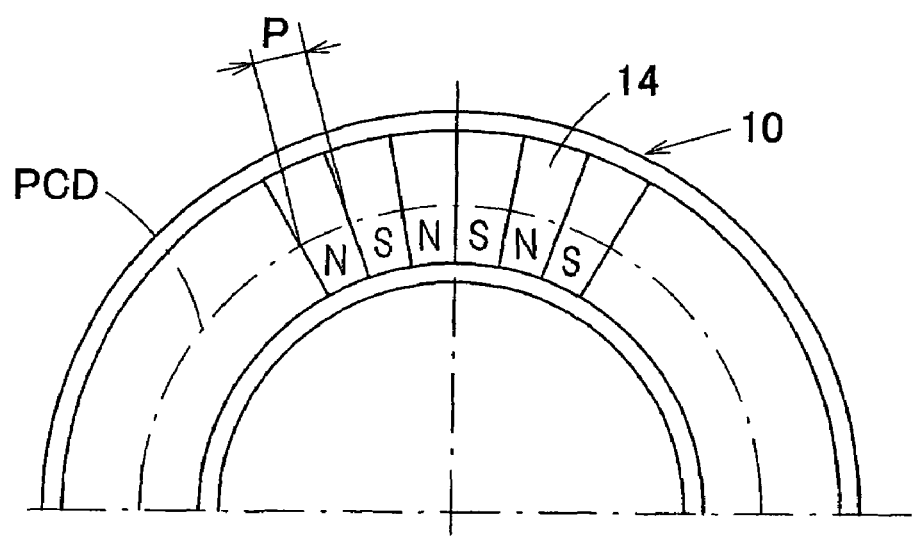
FIG. 2 is an explanatory diagram showing the pattern of magnetic poles with the magnetic encoder viewed from front.
Figure 3:
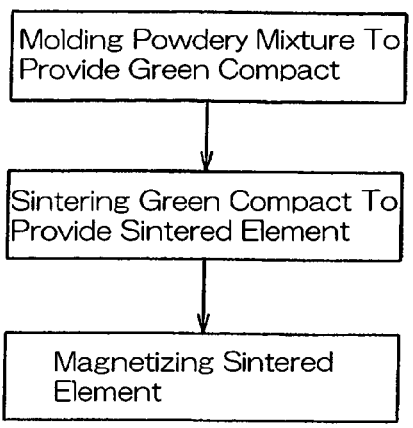
FIG. 3 is a chart showing the sequence of manufacture of a sintered element that is used as a material for a multipolar magnet employed in the magnetic encoder.

Referring particularly to FIGS. 1 to 4, the magnetic encoder according to a first preferred embodiment of the present invention will be described. As best shown in FIG. 1, the magnetic encoder generally identified by 10 includes an annular core metal 11 made of a metallic material and being of a generally Z-shaped sectional configuration including a cylindrical wall 11a, a radial upright wall 11b protruding radially outwardly from one end of the cylindrical wall 11a and a cylindrical overhang wall 11c protruding generally axially from an outer peripheral edge of the upright wall 11b in a direction counter to the cylindrical wall 11a. An annular multipolar magnet 14 is secured to one of opposite annular surfaces of the upright wall 11b, which faces in a direction counter to the cylindrical wall 11a. The multipolar magnet 14 is magnetized in a direction circumferentially thereof to have a plurality of circumferentially alternating opposite magnetic poles N and S and is in the form of a magnetic disc having such alternating magnetic poles N and S. The opposite magnetic poles N and S alternate at intervals of a predetermined pitch p on the pitch circle of a pitch circle diameter PCD as shown in FIG. 2.

This multipolar magnet 14 is prepared from a sintered element made of a mixture of a powdery magnetic material and a powdery binder such as a non-magnetic metallic material. Specifically, the powdery mixture of the magnetic material and the binder is molded under pressure to provide a green compact, which is in turn sintered to provide the sintered element. The multipolar magnet 14 so formed is secured to the core metal 11 by the use of staking technique applied to the core metal 11 to complete the magnetic encoder 10. This magnetic encoder 10, when mounted on a rotating member (not shown), cooperates with a magnetic sensor (also not shown), disposed in face-to-face relation with the multipolar magnet 14, to complete a rotation detecting device for detecting the number of revolutions of the rotating element.

The powdery magnetic material contained in the multipolar magnet 14 may be a powder of isotropic or anisotropic, barium or strontium ferrite and may be in the form of a granulated powder or a pulverized powder of wet type anisotropic ferrite cores. Where the pulverized powder of wet type anisotropic ferrite cores is employed for the powdery magnetic material, it is necessary for the powdery mixture thereof with the binder, which may be the non-magnetic metallic material, to form an anisotropic green compact.

The powdery magnetic material may be a powder of rare earth magnetic material. A magnetic powder of samarium iron (SmFeN) or a magnetic powder of neodymium iron (NdFeB), both of which are a rare earth magnetic material, can conveniently be employed for the powdery magnetic material. Also, other than those specific powders, the powdery magnetic material may be a gas atomized powder of manganese aluminum (MnAl).

The powdery magnetic material may be a mixture of two or more of a magnetic powder of samarium iron (SmFeN), a magnetic powder of neodymium iron (NdFeB) and a gas atomized powder of manganese aluminum (MnAl). By way of example, a mixture of the magnetic powder of samarium iron (SmFeN) and the magnetic powder of neodymium iron (NdFeB), or a mixture of the gas atomized powder of manganese aluminum and the magnetic powder of samarium iron, or a mixture of the magnetic powders of samarium iron and neodymium iron and the gas atomized powder of manganese aluminum can be conveniently employed for the powdery magnetic material. Where the sole use of the ferrite powder appears to result in an insufficient magnetic force, the ferrite powder may be mixed with a required amount of the magnetic powder of samarium iron or the magnetic powder of neodymium iron, so that the multipolar magnet 14 can provide an increased magnetic force while being manufactured inexpensively.

The powdery non-magnetic metallic material contained in the multipolar magnet 14 may be a powder of one or a mixture of tin, copper, aluminum, nickel, zinc, tungsten, manganese and non-magnetic stainless steel, or an alloyed powder of two or more of them.

A metallic material that can be used to form the core metal 11 is preferably a ferromagnetic material and, for example, a steel plate having a magnetic property and a rust preventive property can be suitably employed therefor. Examples of such steel plate include a stainless steel plate of ferrite (SUS 430 or the like according to the JIS Standard) or a rolled steel plate treated to have a rust resistant property and so on.

The core metal 11 may be of any suitable annular configuration and preferably has a shape capable of permitting the multipolar magnet 14 to be fixed thereto. In particular, the core metal 11 preferably has such a shape that the multipolar magnet 14 can be mechanically fixed thereto by means of staking or interference fitting.

Where the core metal 11 is fixed in position by the use of the staking technique, the core metal 11 is of a generally Z-sectioned annular shape including, as best shown in FIG. 1, the cylindrical wall 11a adapted to be mounted on the rotating element, the radial upright wall 11b extending radially outwardly from one end of the cylindrical wall 11a, and a cylindrical overhang wall 11c extending axially outwardly from the outer peripheral edge of the radial upright wall 11b as hereinbefore described.

It is, however, to be noted that the core metal 11 may alternatively be of a generally L-sectioned annular shape, in which case the cylindrical overhang wall 11c is dispensed with and a plurality of circumferentially spaced pawls or fingers, for example, have to be formed integrally with the radially outer end of the radial upright wall 11b so that the multipolar magnet 14 can be retained in position on the core metal 11 with the pawls or fingers staked inwardly.

The core metal 11 of FIG. 1 including the cylindrical wall 11a, the radial upright wall 11b and the cylindrical overhang wall 11c is made of a single metallic plate such as a steel plate by the use of any known press work. The radial upright wall 11b is of an annular flat shape, and the sintered element having not yet been magnetized and eventually forming the multipolar magnet 14 is held flat against the surface of the radial upright wall 11b opposite to the cylindrical wall 11a, with the cylindrical overhang wall 11c so staked radially inwardly as to fix the multipolar magnet 14 to the radial upright wall 11b of the core metal 11 in overlapped relation.

The cylindrical overhang wall 11c has a free end portion, a part or the entirety of which defines a staking area that is staked radially inwardly to secure the sintered element to the core metal 11 in the manner described above. As a matter of course, this staking area of the cylindrical overhang wall 11c extends over the entire circumference of the core metal 11 and, hence, represents an annular shape.

The multipolar magnet 14 can be manufactured by a process including a step of providing a green compact by molding a powdery mixture of the powdery magnetic material and the binder, that is, the powdery non-magnetic metallic material under pressure to provide the green compact, a step of sintering the green compact to form the sintered element and a step of magnetizing the sintered element.

Molding conditions for the formation of the multipolar magnet 14 will now be described in detail. In the practice of the molding step for providing the green compact from the powdery mixture, a molding pressure of not lower than 65 tons is employed in place of 40 tons hitherto employed. Also, while the binder hitherto employed has a particle size of 40 μm, the binder employed in the illustrated embodiment of the present invention has a particle size smaller than 40 μm, preferably not greater than 20 μm. In such case, the sintered element is formed to have a density preferably not lower than 6.6 g/cm$^3$. Comparison data between the sintered element (the multipolar magnet 14) of the present invention and the conventional sintered element (the conventional magnet) is shown in the following Table 1.

TABLE 1

| Molding Force (ton) | Binder Particle Size (μm) | Density (g/cm$^3$) | Evaluation | Critical Interference |
|---|---|---|---|---|
| 40 | 40 | 6.50 | Δ | small |
| 65 | 40 | — | ◯ | medium |
|  | 20 | 6.63 | ◎ | large |

In Table 1 above, the critical interference represents the critical value of interference at which no cracking occur in the multipolar magnet 14 when the magnetic encoder 10 is press-fitted into the wheel support bearing assembly. Table 1 makes it clear that in the conventional magnetic encoder assembled using the molding force of 40 tons and the binder of 40 μm in particle size, the density of the sintered element, which eventually forms the multipolar magnet 14 was 6.50 g/cm$^3$ and the critical interference was small. In contrast thereto, since in the illustrated embodiment the molding force is increased and the binder of 20 μm in particle size is used, the critical interference can be increased as compared with that in the conventional magnetic encoder and, hence, an undesirable occurrence of cracking in the multipolar magnet 14, which would otherwise occur when the magnetic encoder 10 is press-fitted into the wheel support bearing assembly, can advantageously be avoided with the pitch precision maintained. Also, it is possible to prevent an undesirable deterioration of the magnetic characteristic which would otherwise result from formation of rusting induced by the presence of cracks in the multipolar magnet 14 and, therefore, an undesirable reduction in sensing function of the magnetic encoder 10 can also be avoided.

The binder may have a particle size not greater than 40 μm and the density of the sintered element may be not smaller than 6.6 g/cm³. Preferably, the particle size of the binder is not greater than 20 μm. Even in such case, the critical interference can be increased as compared with that in the conventional counterpart and reduction in sensing function can advantageously be avoided.

The volume based mixing ratio of the powdery magnetic material and the binder both contained in the powdery mixture will now be considered. An example of the powdery mixture containing a maximum quantity of the binder is employed in the form of an example of the composition (Example 1) having a magnetic characteristic substantially equivalent to that exhibited by the rubber magnet.

In Example 1, the ratio of the powdery magnetic material relative to the binder is 55:45. In contrast thereto, in Example 2, the ratio of the powdery magnetic material relative to the binder is 70:30 and, in Example 3, the ratio of the powdery magnetic material relative to the binder is 80:20.

Figure 4:
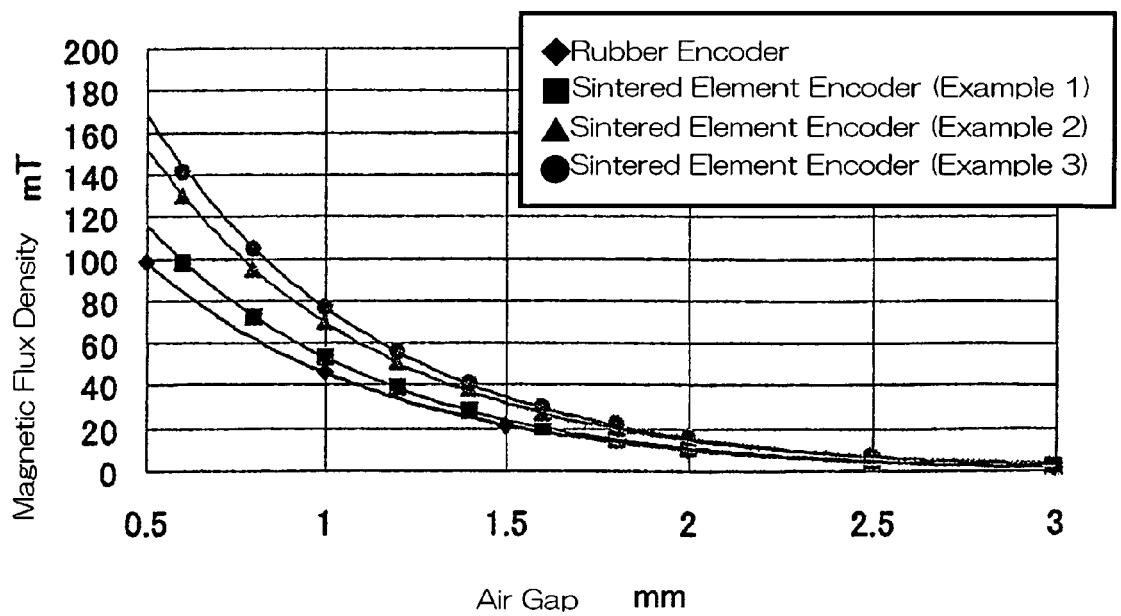
FIG. 4 is a chart showing data descriptive of the relationship between the air gap and the magnetic flux density exhibited by the magnetic encoders of the present invention and a conventional magnetic encoder.

Data on the relationship between the air gap and the magnetic flux density exhibited by each of the magnetic encoders (Examples 1 to 3) of the foregoing compositions are shown in FIG. 4. In FIG. 4, the curve obtained by plotting points each marked by the symbol ■ represents the mixing ratio (powdery magnetic material:binder=55:45) according to Example 1; the curve obtained by plotting points each marked by the symbol ▼ represents the mixing ration (powdery magnetic material:binder=70:30) according to Example 2; the curve obtained by plotting points each marked by the symbol ● represents the mixing ratio (powdery magnetic material:Binder=80:20) according to Example 3; and the curve obtained by plotting points each marked by the symbol ♦ represents the mixing ratio employed in the rubber encoder.

The chart shown in FIG. 4 makes it clear that for the same air gap, the magnetic encoder 10 of Example 2 has the magnetic flux density increased about 25% as compared with Example 1, and the magnetic encoder 10 of Example 3 has the magnetic flux density increased about 35% as compared with Example 1. The degree of increase in the magnetic flux density corresponds to the degree of increase in amount of the magnetic powder. The chart also makes it clear that so far as the air gap required to secure the same magnetic flux density is concerned, Example 2 allows the larger air gap than Example 1 and Example 3 allows the larger air gap than Example 2.

From the foregoing, it is clear that in the magnetic encoder 10 according to any of Examples 2 and 3, the critical detection value of the magnetic sensor to be used in combination with the magnetic encoder can be increased to a value higher than that in Example 1. In other words, for the same gap, while the magnetic encoder of Example 1 requires the magnetic sensor capable of detecting the magnetic flux density of not lower than 10 mT, the magnetic encoder of Examples 2 or 3 only requires the magnetic sensor capable of detecting the magnetic flux density of not lower than 15 mT and, therefore, the cost of the magnetic sensor can advantageously be reduced. Also, since the air gap between the magnetic encoder 10 and the magnetic sensor can be increased, the freedom of design of the surrounding of the rotation detecting device can be increased.

Considering the test results shown in FIG. 4, when the air gap x is not smaller than 0.5 mm, the relation between the air gap x and the magnetic flux density y (mT) can be approximately expressed as follows:

| | |
|---|---|
| Rubber Encoder | $y = 210\ e^{-1.5x}$ |
| Sintered Element Encoder (Example 1: Equivalent to Rubber Encoder) | $y = 250\ e^{-1.5x}$ |
| Sintered Element Encoder (Example 2: Product A having an increased magnetic characteristic) | $y = 320\ e^{-1.5x}$ |
| Sintered Element Encoder (Example 3: Product B having an increased magnetic characteristic) | $y = 350\ e^{-1.5x}$ |

As far as Example 3 is concerned, although the magnetic density flux increases, further increase of the magnetic flux density will result in shortage of the binder since the quantity of the powdery magnetic material has to be increased, and, therefore, there is a risk that cracking may occur in the multipolar magnet 14 when the magnetic encoder 10 is press-fitted into, for example, a bearing. If the magnetic flux density y (mT) is not higher than $210\ e^{-1.5x}$, no high magnetic flux density, which is a merit of the sintered element, can be obtained any longer and it will become equivalent to the rubber encoder.

If the relation between the air gap x and the magnetic flux density y is within the range of $210\ e^{-1.5x} < y < 320\ e^{-1.5x}$ (corresponding to the range between the rubber encoder and Example 2), the critical interference of the present invention magnetic encoder will be large as compared with that in the magnetic encoder utilizing the conventional sintered element, and not only can cracking or breaking in the multipolar magnet 14 during the press-fitting be avoided, but also reduction in wall thickness, increase in sensitivity and minimized susceptibleness to surface damages can also be obtained. Selection of the range of $250\ e^{-1.5x} < y < 320\ e^{-1.5x}$ (corresponding to the range between Example 1 and Example 2) is effective to enhance reduction in wall thickness and increase in sensitivity.

Figure 5:
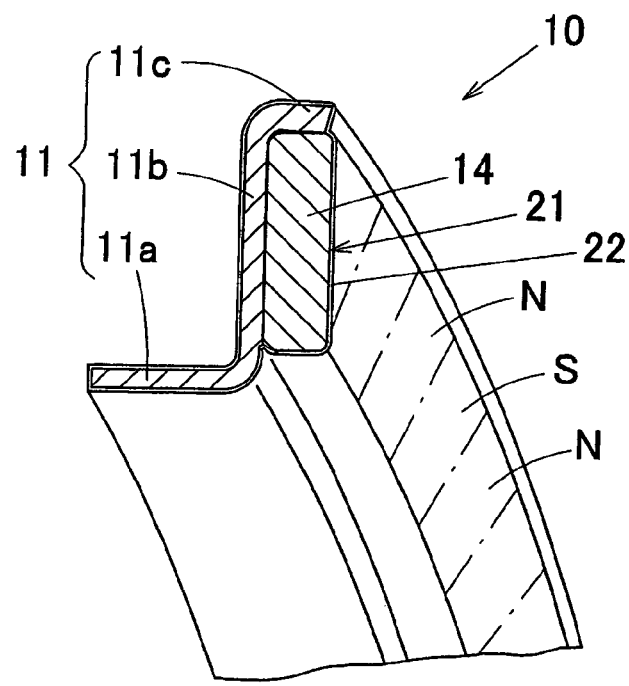
FIG. 5 is a fragmentary perspective view showing a portion of a magnetic encoder according to a second preferred embodiment of the present invention.

FIG. 5 illustrates a second preferred embodiment of the present invention. The magnetic encoder 10 shown therein is substantially similar to that shown and described in connection with the first embodiment with reference to FIGS. 1 to 4, except that in this embodiment of FIG. 5 a rust preventive coating 22 having a film thickness within the range of 15 to 35 μm is formed over the entire surface of the magnetic encoder by the use of an cationic coating technique. More specifically, a sintered element-core metal assembly 21 which is formed by fixing the multipolar magnet 14 to the core metal 11 by the use of the staking technique has its surface coated with the rust preventive coating 22 by means of an electrodeposition technique, employed as a rust preventive surface treatment, to thereby form the magnetic encoder 10. The electrodeposition of the rust preventive coating 22 is accomplished by supplying an electric current to the assembly 21, which is immersed in an aqueous solution of coating material, and depositing the rust preventive coating 22 on the surface of the assembly 21 electrochemically by the effect of electrophoretic migration. The film thickness of the rust preventive coating 22 is preferably within the range of 30 to 35 μm. If the film thickness of the rust preventive coating 22 is smaller than 15 μm, the rust preventing performance will be lowered, but if the film thickness thereof exceeds the upper limit of 35 μm, the intended electrodeposition will be impossible. The tolerance of the film thickness of the cationic coating is ±5 μm.

Data [(Number of products, in which cracking occurred)/the total number of products tested]] concerning the frequency of occurrence of cracking in the rust preventive coating 22, when the magnetic encoder 10 according to this second embodiment was press-fitted into the wheel support bearing assembly are shown in Table 2.

TABLE 2

| Interference | Film Thickness (μm) | |
| --- | --- | --- |
| (μm) | 20 | 35 |
| 130 | 0/4 | 0/4 |
| 150 | 3/4 | 0/4 |
| 170 | | 0/4 |

The test results shown in Table 2 make it clear that if the film thickness of the rust preventive coating 22 is 20 μm, cracking occurred in the rust preventive coating 22 when the interference was 150 μm. They also make it clear that if the film thickness is 35 μm, no cracking occurred in the rust preventive coating 22 even when the interference was 170 μm.

As described above, according to the second embodiment shown in FIG. 5, the use of the rust preventive coating 22 over the entire surface of the magnetic encoder 10 by the use of the cationic coating technique is effective to avoid an undesirable corrosion of the magnetic encoder 10 which would otherwise take place when wetted with saline mud water, thereby preventing the magnetic characteristic from being degraded. Also, selection of the film thickness of the rust preventive coating 22 within the range of 15 to 35 μm is effective to increase the critical interference (the limit of the interference at which cracking will no longer occur in the rust preventive coating 22) when the magnetic encoder 10 is press-fitted into the wheel support bearing assembly or the like, thereby providing a large safety factor relative to the design interference.

It is to be noted that although in the foregoing embodiment the core metal 11 has been shown and described as having a generally L-sectioned or Z-sectioned annular shape with the multipolar magnet 14 secured to the radial upright wall 11b, the present invention can be equally applied to a radial type rotation detecting device, in which the multipolar magnet 14 is so secured to an outer peripheral surface of the core metal 11 as to face in a radial direction of the bearing.

An example of a wheel support bearing assembly, equipped with the magnetic encoder 10 of the structure shown and described in connection with the first embodiment of the present invention with reference to FIGS. 1 to 4, and also with a sealing unit 5 will now be described in detail with particular reference to FIGS. 6 and 7. Particularly as shown in FIG. 7, the wheel support bearing assembly includes an inner member 1, an outer member 2 enclosing the inner member 1 therein with an annular bearing space delimited between it and the inner member 1, inboard and outboard rows of rolling elements 3 rollingly interposed between the inner and outer members 1 and 2, and inboard and outboard sealing units 5 and 13 for sealing respective opposite open ends of the annular bearing space. It is the inboard sealing unit 5 that is fitted with the magnetic encoder 10. The inner member 1 has an outer peripheral surface formed with axially spaced inner raceway grooves 1a, whereas the outer member 2 has an inner peripheral surface formed with axially spaced outer raceway grooves 2a, with the inboard and outboard rows of the rolling elements 3 received in part within the inner raceway grooves 1a and in part within the outer raceway grooves 2a, respectively.

The inner member 1 and the outer member 2 represent a member positioned on an inner peripheral side of the bearing assembly and a member positioned on an outer peripheral side of the bearing assembly, respectively, which are rotatable relative to each other through the rows of the rolling elements 3. The inner and outer members 1 and 2 may be bearing inner and outer races, respectively. Alternatively, each of the inner and outer members 1 and 2 may be a combination of the bearing inner or outer race with a separate component. In addition, the inner member 1 itself may be a shaft member. The rolling elements 3 may be either a ball or a tapered roller, although in the illustrated embodiment the balls are employed therefor.

The illustrated wheel support bearing assembly is a dual row rolling bearing assembly, more specifically a dual row angular ball bearing assembly, in which the inner member 1 is made up of an hub axle 6 and an inner race 7 fixedly mounted on an inboard end of the hub axle 6, with the inner raceway grooves 1a and 1a formed on respective outer peripheral surfaces of the hub axle 6 and the inner race 7.

The hub axle 6 is drivingly coupled with one end (for example, an outer race) of a constant velocity universal joint (not shown) and has a radially outwardly extending flange 6a to which an automobile wheel (not shown) is fitted by means of a plurality of bolts 8 for rotation together therewith. The constant velocity universal joint is drivingly connected at the other end (for example, an inner race) thereof with a drive shaft (not shown). The outer member 2 has a radially outwardly extending flange 2b formed integrally therewith and is secured to a housing (not shown) such as a knuckle of an automobile wheel suspension system through the flange 2b. The rolling elements 3 of each row is rollingly retained by a corresponding ball retainer 4.

Figure 6:
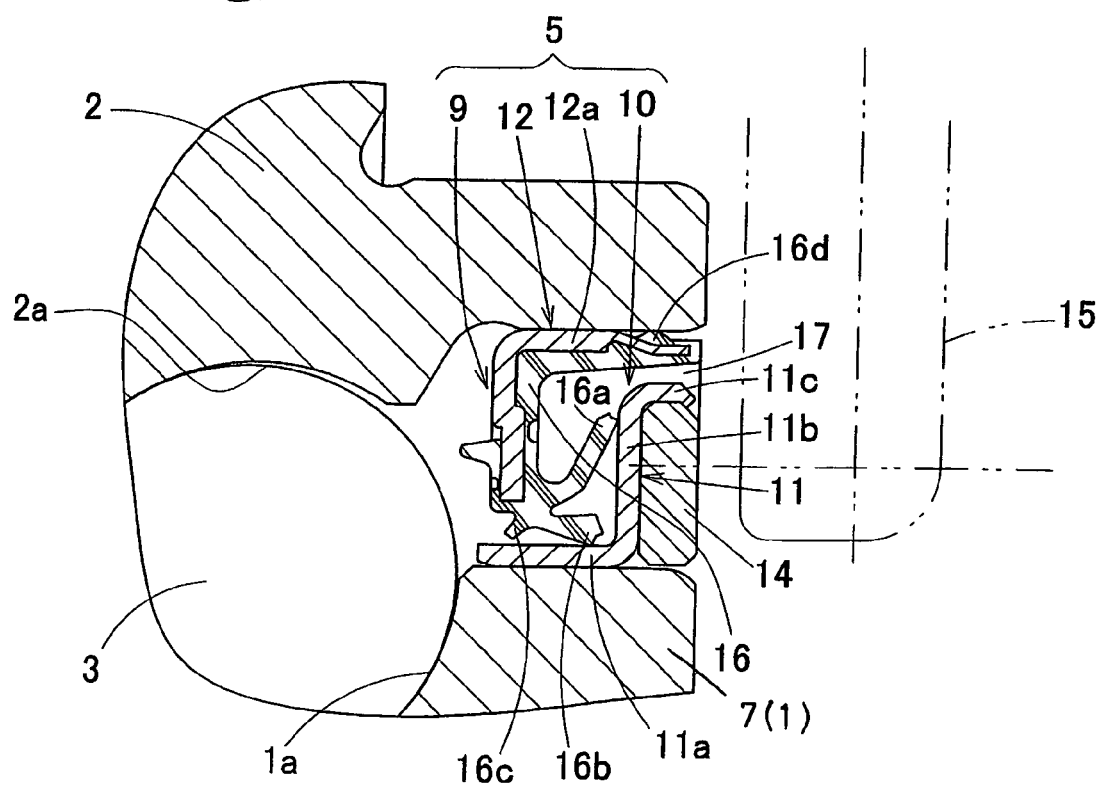
FIG. 6 is a fragmentary longitudinal sectional view showing a sealing device equipped with the magnetic encoder according to the first preferred embodiment of the present invention.
Figure 7:
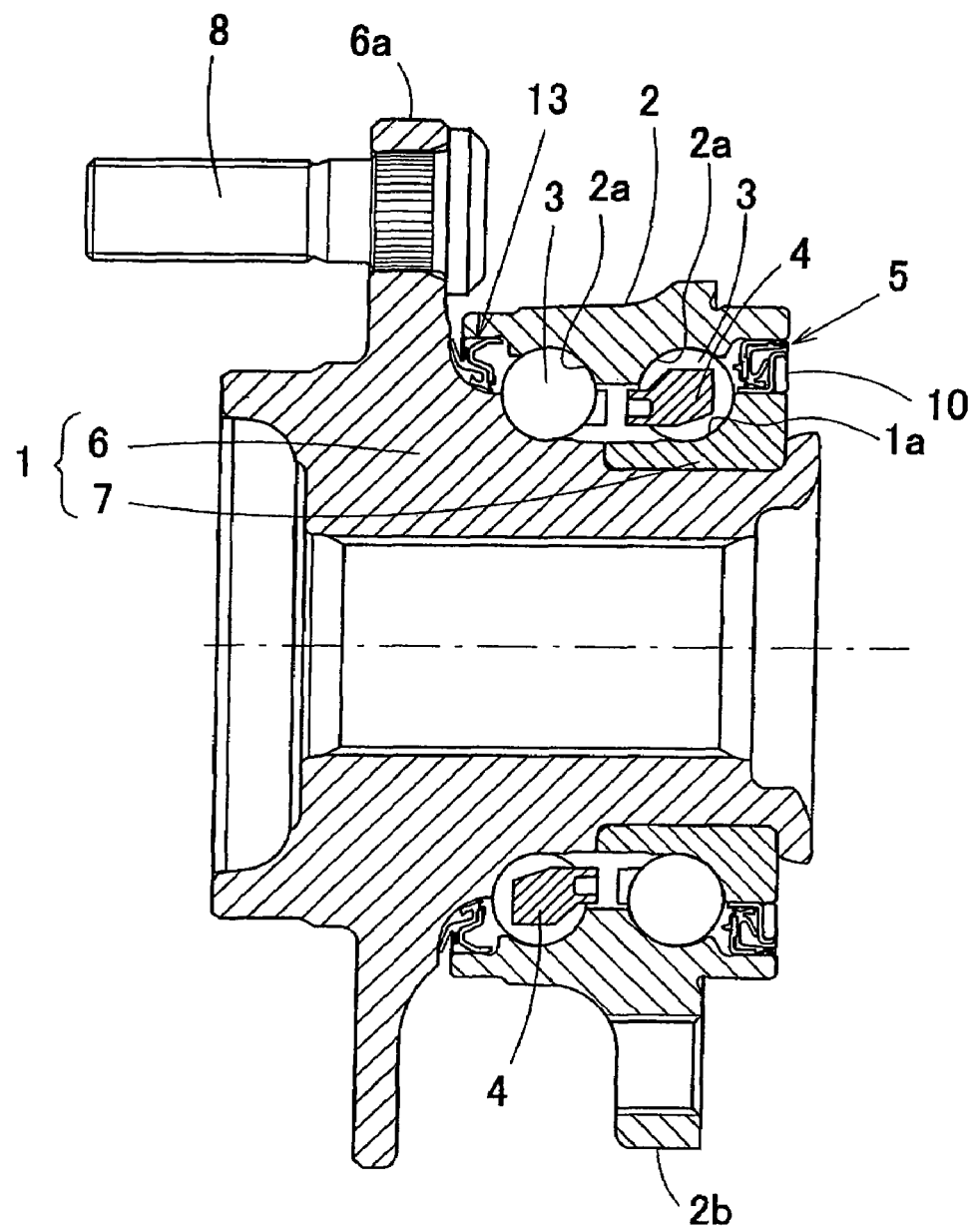
FIG. 7 is a longitudinal sectional view of a wheel support bearing assembly utilizing the sealing device shown in FIG. 6.

FIG. 6 illustrates, on an enlarged scale, the inboard sealing unit 5 equipped with the magnetic encoder 10. In this inboard sealing unit 5, the magnetic encoder 10 or the core metal 11 thereof serves as a slinger mounted on one of the inner and outer members 1 and 2, which serves as a rotatable member. In the illustrated instance, since the rotatable member is the inner member 1, the magnetic encoder 10 is mounted on the inner member 1 for rotation together therewith. FIG. 6 illustrates the example, in which the magnetic encoder 10 represents one of the component parts of the inboard sealing unit 5, with the magnetic encoder 10 mounted on the inner race 7. This sealing unit 5 is comprised of the magnetic encoder 10 and a sealing member 9 secured to the other of the inner and outer members 1 and 2, which serves as a non-rotatable or stationary member.

More specifically, the inboard sealing unit 5 includes a first annular sealing plate 11 secured to the inner member 1 and a second annular sealing plate 12 secured to the outer member 2. The first sealing plate 11 itself is the core metal 11 of the magnetic encoder 10, which has been described hereinbefore, and, therefore, the term "core metal 11" is hereinafter used to represent the first sealing plate 11. The magnetic encoder 10 is of the design, which has been shown and described in connection with the first embodiment of the present invention with particular reference to FIGS. 1 to 4, and, therefore, the details thereof are not reiterated for the sake of brevity. The magnetic sensor 15 is disposed in face-to-face relation with the multipolar magnet 14 of the magnetic encoder 10 to constitute the rotation detecting device for the detection of the number of revolution of the automobile wheel.

The second sealing plate 12 is one of the component parts forming the sealing member 9 and is integrated with a side sealing lip 16a, slidingly engageable with the radial upright wall 11b of the core metal 11, and radial sealing lips 16b and 16c slidingly engageable with the cylindrical wall 11a of the core metal 11. Those sealing lips 16a to 16c form a part of an elastic member 16 bonded by vulcanization to the second sealing plate 12. Although the number of the sealing lips may be any arbitrary number, the embodiment shown in FIG. 6 makes use of the single side sealing lip 16a and the two radial sealing lips 16c and 16b axially spaced. The second sealing plate 12 is mounted on the stationary outer member 2 through the elastic sealing member 16. In other words, the elastic member 16 includes a cover-up portion 16d for covering a region of the cylindrical wall 12a of the second sealing plate 12 from an inner peripheral surface to an outer peripheral portion of a free end of the cylindrical wall 12a, with the cover-up portion 16d intervening between the second sealing plate 12 and the outer member 2. The cylindrical wall 12a of the second sealing plate 12 and the cylindrical overhang wall 11c of the core metal 11, which is the first sealing plate, are radially spaced to define a gap therebetween, which gap forms a labyrinth seal 17.

With the wheel support bearing assembly of the structure described hereinabove, rotation of the inner member 1 together with the automobile wheel can be detected by the magnetic sensor 15 through the magnetic encoder 10, mounted on the inner member 1, and the number of revolutions of the automobile wheel can therefore be detected.

Since the magnetic encoder 10 is used as one of the component parts of the sealing unit 5, the revolution of the automobile wheel can be detected with no need to increase the number of component parts used. While the wheel support bearing assembly is exposed to such a severe environment of the road surface that the magnetic encoder 10 may be wetted with saline muddy water found on the road surface, since the multipolar magnet 14 is made of the sintered element, the surface hardness is so high, as compared with that of the rubber encoder, that the risk of the multipolar magnet 14 being damaged as a result of collision with foreign matters can be minimized. Also, since the sintered element forming the multipolar magnet 14 is molded under such conditions as described hereinbefore, no cracking occurs in the multipolar magnet 14 when the magnetic encoder 10 is press-fitted on the inner member 1 and, therefore, the handling of the magnetic encoder 10 can advantageously be facilitated. As a result thereof, the pitch precision of the multipolar magnet 14 can be maintained and, since degradation of the magnetic characteristic, which would result from formation of rusts as a result of cracking, can advantageously be avoided, resulting in increase of the detecting accuracy of the rotation detecting device.

The sealing between the inner and outer members 1 and 2 can be achieved by the sliding engagement of the sealing lips 16a to 16c, provided on the second sealing plate 12, and the labyrinth seal 17, which is defined by positioning the cylindrical overhang wall 11c of the core metal 11 in face-to-face relation with the cylindrical wall 12a of the second sealing plate 12 with a gap formed therebetween.

It is to be noted that where the magnetic encoder 10 is used as one of the component parts of the sealing unit 5 for the bearing assembly, the multipolar magnet 14 may be provided on one of the opposite surfaces of the radial upright wall 11b of the core metal 11, which surface is oriented inwardly of the bearing assembly. In such case, the core metal 11 is preferably made of a non-magnetic material.

Also, where the outer member 2 serves as a rotatable member, the magnetic encoder 10 has to be secured to the outer member 2.

Figure 8:
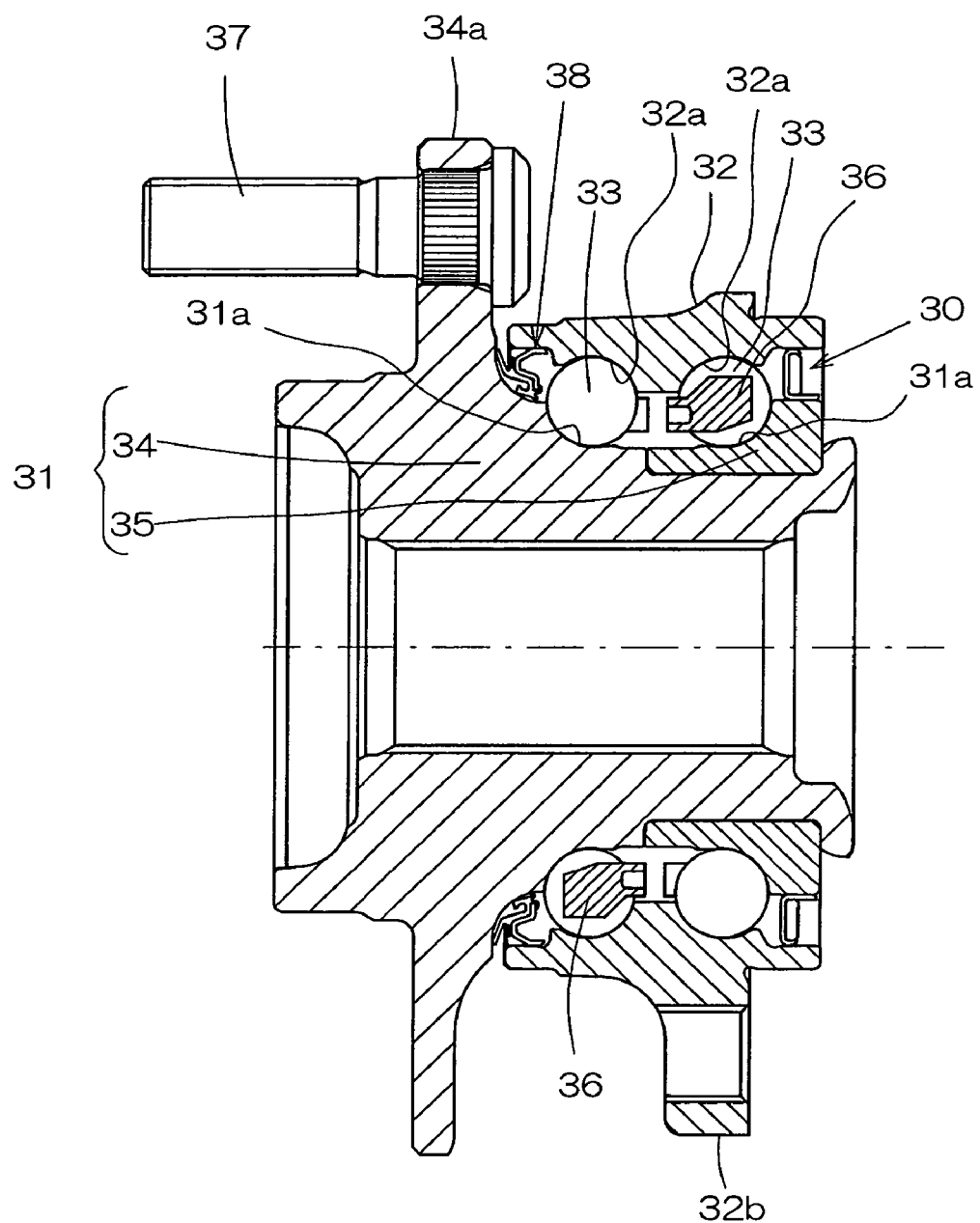
FIG. 8 is a longitudinal sectional view of the wheel support bearing assembly utilizing a magnetic encoder according to a third preferred embodiment of the present invention.

FIGS. 8 to 16 illustrates the magnetic encoder according to a third preferred embodiment of the present invention. In particular, FIG. 8 illustrates the wheel support bearing assembly equipped with the magnetic encoder 30 according to the third embodiment of the present invention. It is to be noted that in the description made hereinbefore and hereinafter, the terms "inboard" and "outboard" represent the sides facing the inside and the outside of the vehicle, respectively. In FIG. 8, for example, a left side and a right side represent the outboard side and the inboard side, respectively.

The wheel support bearing assembly shown therein includes an inner member 31, an outer member 32 enclosing the inner member 31 therein with an annular bearing space delimited between it and the inner member 31, inboard and outboard rows of rolling elements 33 rollingly interposed between the inner and outer members 31 and 32, an outboard sealing unit 38 for sealing an outboard open end of the annular bearing space, and the magnetic encoder 30 mounted in an inboard open end of the annular bearing space. The inner member 31 has an outer peripheral surface formed with axially spaced inner raceway grooves 31a, whereas the outer member 32 has an inner peripheral surface formed with axially spaced outer raceway grooves 32a, with the inboard and outboard rows of the rolling elements 33 received in part within the inner raceway grooves 31a and in part within the outer raceway grooves 32a, respectively. The rolling elements 33 of each row is rollingly retained by a corresponding ball retainer 36 and are, in the illustrated instance, employed in the form of a ball.

The illustrated wheel support bearing assembly is a dual row rolling bearing assembly, more specifically a dual row angular ball bearing assembly, in which the inner member 31 is made up of an hub axle 34 and an inner race 35 fixedly mounted on an inboard end of the hub axle 34, with the inner raceway grooves 31a and 31a formed on respective outer peripheral surfaces of the hub axle 34 and the inner race 35.

The hub axle 34 is, in the case of an automobile drive wheel, drivingly coupled with one end of a constant velocity universal joint (not shown) and has a radially outwardly extending flange 34a to which the automobile drive wheel (not shown) is fitted by means of a plurality of bolts 37 for rotation together therewith. The constant velocity universal joint is drivingly connected at the other end thereof with a drive shaft (not shown). The outer member 32 has a radially outwardly extending flange 32b formed integrally therewith and is secured to a housing (not shown) such as a knuckle of an automobile wheel suspension system.

Figure 10:
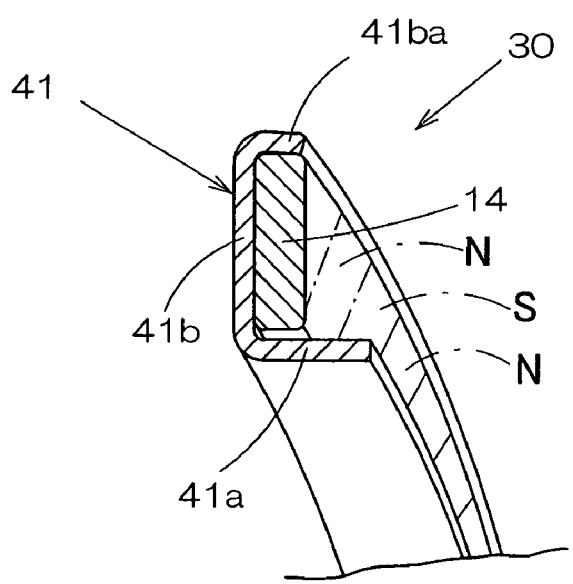
FIG. 10 is a fragmentary perspective view showing a portion of the third embodiment magnetic encoder employed in the wheel support bearing assembly shown in FIG. 8.
Figure 11:
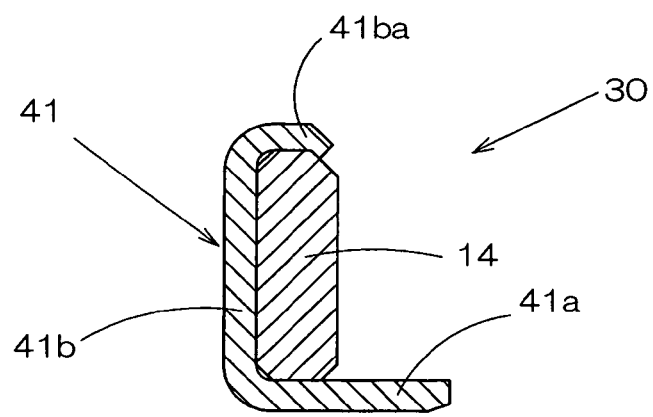
FIG. 11 is a transverse sectional view of a portion of the magnetic encoder shown in FIG. 9.

FIG. 10 illustrates a fragmentary perspective view of a portion of the magnetic encoder 30 and FIG. 11 illustrates a sectional view of the magnetic encoder 30. The illustrated magnetic encoder 30 includes an annular multipolar magnet 14 having a plurality of alternating opposite magnetic poles formed in a direction circumferentially thereof, and an annular core metal 41 supporting the multipolar magnet 14. The core metal 41 includes a cylindrical wall 41a and a radial upright wall 41b protruding radially outwardly from one end of the cylindrical wall 41a. The multipolar magnet 14 is positioned on one of opposite surfaces of the radial upright wall 41b, which faces in a direction conforming to the direction of protrusion of the cylindrical wall 41a. A free end of the radial upright wall 41b is formed as a staking wall 41ba extending in a direction conforming to the direction in which the surface of the radial upright wall 41b, where the multipolar magnet 14 is arranged, faces. By staking this staking wall 41ba, the multipolar magnet 14 is fixed to the core metal 41.

Figure 9:
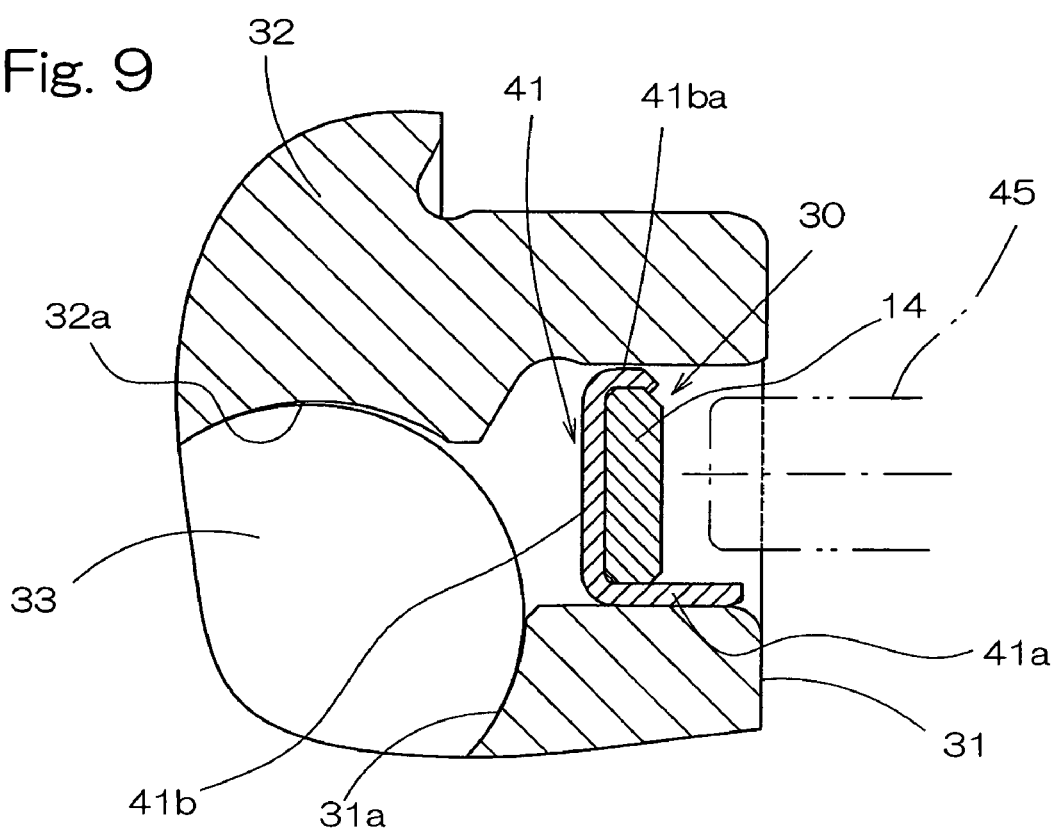
FIG. 9 is a fragmentary sectional view, on an enlarged scale, showing a portion of the wheel support bearing assembly shown in FIG. 8.

As shown in FIG. 9 on an enlarged scale, when the cylindrical wall 41a of the core metal 41 is press-fitted on the outer periphery of the inboard end of the inner member 31, which is a rotatable member, the multipolar magnet 14 can be fixed on the inner member 31 so as to confront the inboard side. A magnetic sensor 45 is fitted to, for example, the outer member 32 so as to align with the magnetic encoder 30. The magnetic sensor 45 is operable to detect change in magnetic characteristic of the magnetic encoder 30, resulting from rotation of the inner member 31 that is rotatable together with the automobile wheel, to detect the number of revolution of the automobile wheel.

Figure 12:
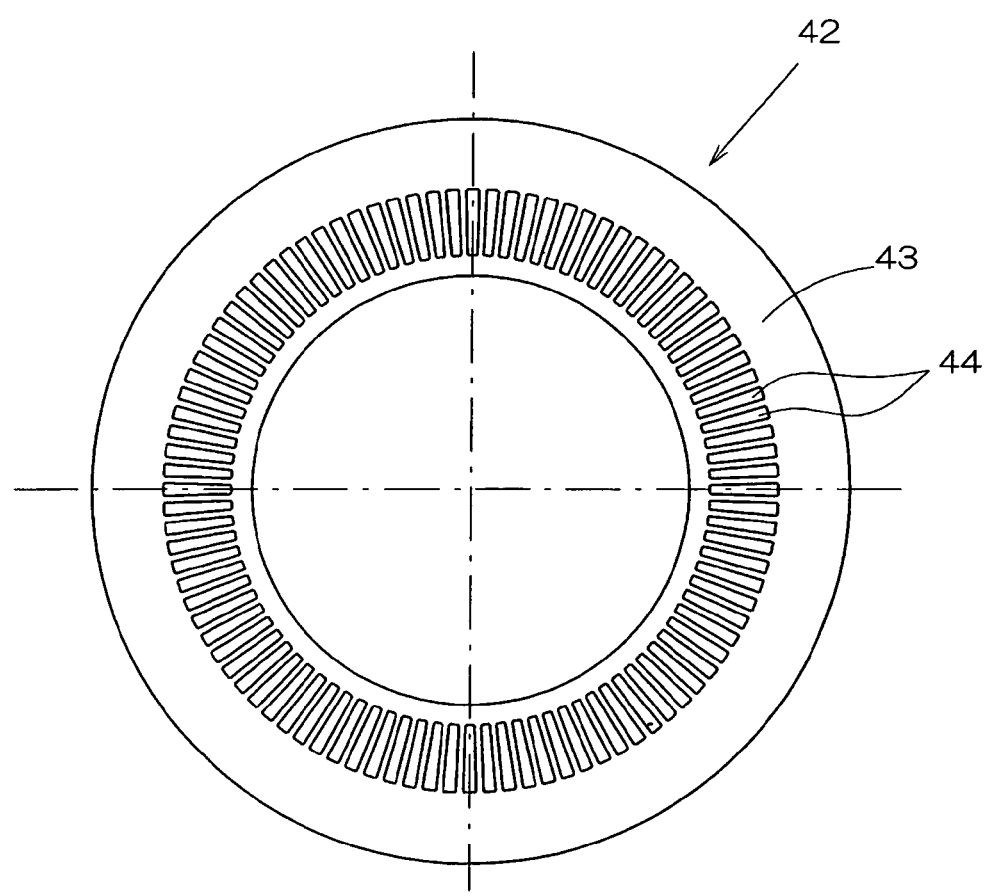
FIG. 12 is a schematic front elevational view showing a magnetizing yoke used to perform one-shot magnetization of a multipolar magnet employed in the magnetic encoder shown in FIG. 9.
Figure 13:
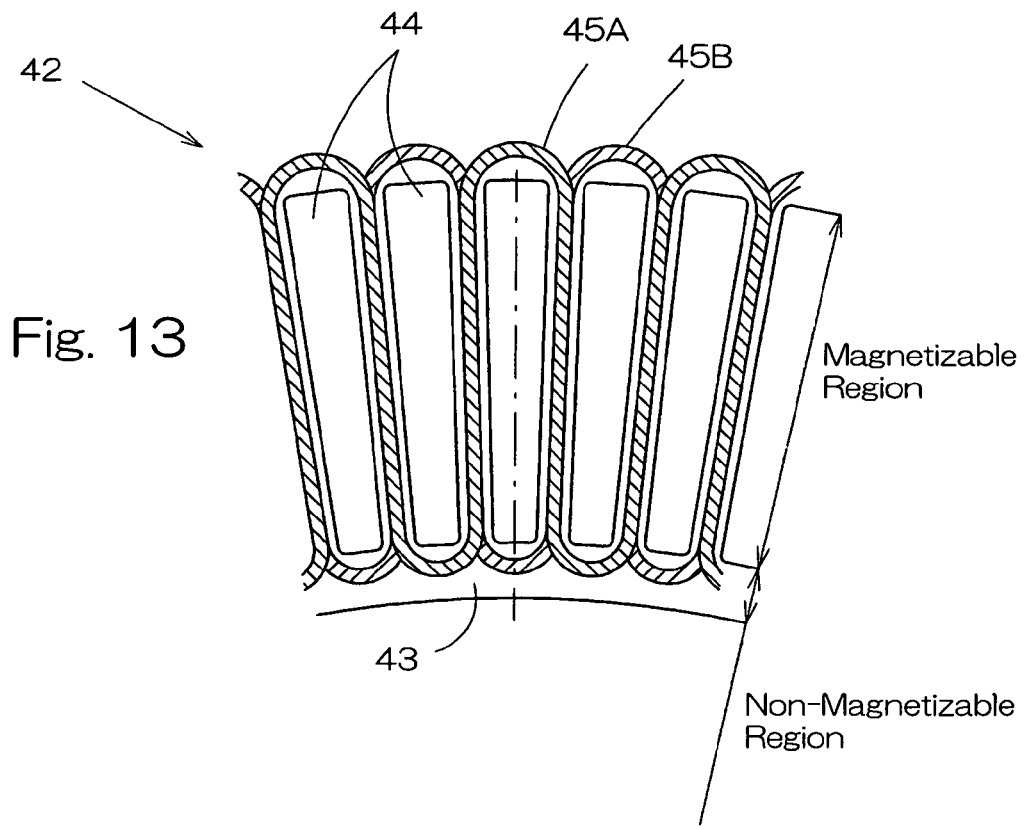
FIG. 13 is a fragmentary front elevational view, on an enlarged scale, showing a portion of the magnetizing yoke shown in FIG. 12.

A material 14A (FIG. 14) of the multipolar magnet 14 is employed in the form of a sintered element containing a powdery magnetic material and is, prior to being fixed to the core metal 41, magnetized by means of one-shot magnetization process to have the plurality of magnetic poles to form the multipolar magnet 14. For one-shot magnetization, a magnetizing yoke 42 shown in a plan view in FIG. 12 is employed. The magnetizing yoke 42 includes an annular support base 43 having a plurality of rectangular magnetizing surface areas 44 arranged on a surface thereof in a direction circumferentially thereof, and different coils 45A and 45B that is wound around each of the magnetizing surface areas 44 so as to overlap one above the other as shown in FIG. 13 on an enlarged scale.

Figure 14:
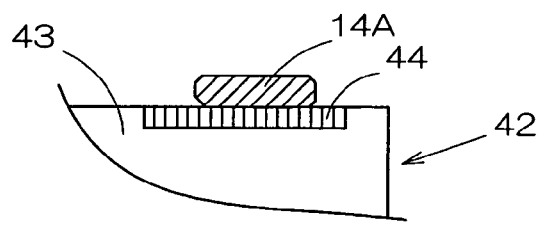
FIG. 14 is a schematic explanatory diagram showing the manner in which a multipolar magnet material is magnetized by one-shot magnetization process.
Figure 15:
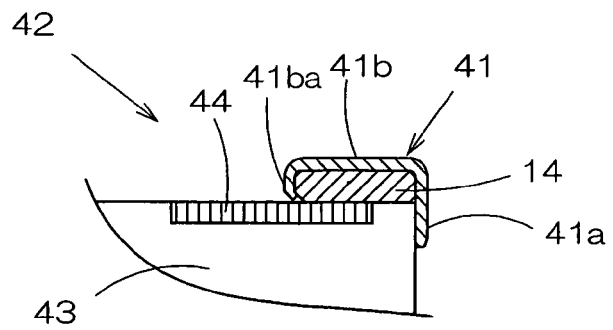
FIG. 15 is a schematic explanatory diagram showing the manner in which a multipolar magnet material supported by a core metal is magnetized by one-shot magnetization process.
Figure 16:
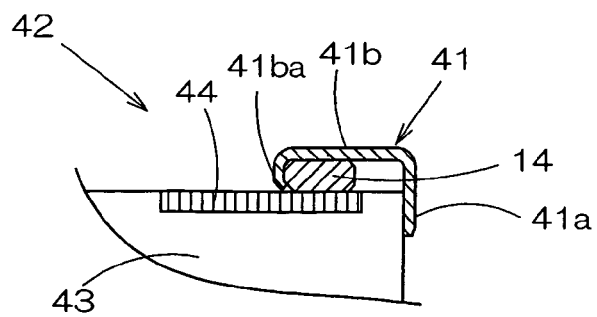
FIG. 16 is a schematic explanatory diagram showing the different manner in which a multipolar magnet material supported by a core metal is magnetized by one-shot magnetization process.

With the multipolar magnet material 14A arranged on an annular region (magnetizable region) of the magnetizing yoke 42, where the magnetizing surface areas 44 are positioned, in overlapping relation therewith as shown in FIG. 14, an electric current is supplied to the coils 45A and 45B to generate the magnetic fields. By so doing, a plurality of alternating opposite magnetic poles N and S can be magnetized to the multipolar magnet material 14A in a direction circumferentially of the material 14A to thereby complete the multipolar magnet 14. Thus, since the multipolar magnet material 14A prior to being secured to the core metal 41 is magnetized by one-shot magnetization process using the magnetizing yoke 42 to form the multipolar magnet 14, the multipolar magnet 14 can easily be formed by one-shot magnetization process without being affected by the shape of the core metal 41.

Where one-shot magnetization is carried out while the multipolar magnet material 14A is secured to the core metal 41, the cylindrical wall 41a of the core metal 41 is positioned along an inner peripheral surface (inner diameter surface) of the magnetizing yoke 42 as shown in FIG. 15. By so doing, the multipolar magnet material 14A can be held in contact with the surface of the magnetizing surface areas 44. However, in this case, a portion of the multipolar magnet material 14A overlaps with a non-magnetizable region departing from the magnetizing surface areas 44 and, therefore, the multipolar magnet material 14A cannot be completely magnetized. In order for the multipolar magnet material 14A to be completely magnetized with one-shot magnetization process, the radial size of the multipolar magnet material 14A has to be shortened, as shown in FIG. 16, to allow the multipolar magnet material 14A to be accommodated within the magnetizable region of the magnetizing yoke 42. It is, however, to be noted that there is a risk that no predetermined magnetic characteristic will be obtained at a required position of the magnetic encoder 30.

As discussed above, in the magnetic encoder 30 according to the third embodiment of the present invention, the annular core metal 41 for supporting the annular multipolar magnet 14 is so designed as to include the cylindrical wall 41a and the radial upright wall 42b protruding radially outwardly from one end of the cylindrical wall 41a, with the multipolar magnet 14 positioned on the surface of the radial upright wall 41b adjacent the cylindrical wall 41a. Accordingly, a widthwise portion of the multipolar magnet 14 can be accommodated within the width of the cylindrical wall 41a of the core metal, allowing the magnetic encoder 30 to be manufactured in a compact size.

As shown in FIG. 9, since the width of the cylindrical wall 41a mounted on the outer periphery of the inner member 31 will not be reduced while the magnetic encoder 30 has a reduced width, a sufficiently high mounting strength for mounting the encoder 30 to the inner member 31 can advantageously be secured through the cylindrical wall 41a. For this reason, it is not necessary to increase the axial length of the inner member 31 for the mounting of the magnetic encoder 30 and, therefore, the wheel support bearing assembly can advantageously be assembled in a compact size and with a lightweight feature.

Also, by fixing the multipolar magnet 14 to the inner member 31 to be oriented towards the inboard side, the multipolar magnet 14 can advantageously be arranged within the annular bearing space at a location generally intermediate of the length of the annular bearing space without increasing the axial length of the bearing space on the inboard side. For this reason, the rotation detecting device can be assembled compact in size by arranging the magnetic sensor, which faces the multipolar magnet 14, deep into the annular bearing space.

Also, with the magnetic encoder 30 of the structure described above, since the multipolar magnet material 14A prior to be fixed to the core metal 41 is magnetized by the use of the one-shot magnetization process to form the multipolar magnet 14, the multipolar magnet 14 can easily be formed even though the core metal 41 is of such a shape as hereinbefore described. Therefore, even though the multipolar magnet material 14A contains the magnetic material selected from the group consisting of ferrite, samarium ferrite and neodymium ferrite, the multipolar magnet material 14A can easily be magnetized to form the multipolar magnet 14.

Figure 17A:
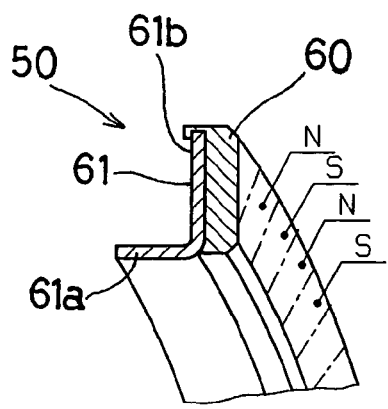
FIG. 17A is a fragmentary perspective view showing a portion of the conventional magnetic encoder.
Figure 17B:
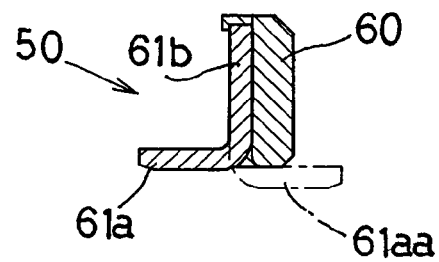
FIG. 17B is a sectional view of that portion of the conventional magnetic encoder of FIG. 17A.
Figure 18:
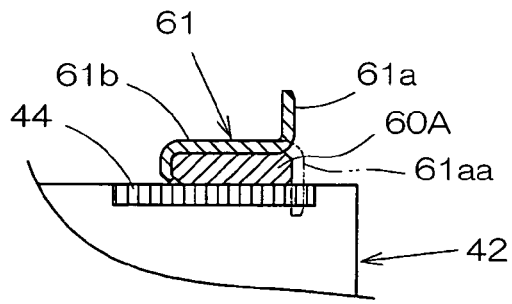
FIG. 18 is a schematic explanatory diagram showing the manner in which the multipolar magnet material employed in the conventional magnetic encoder is magnetized by one-shot magnetization process.

In the meantime, as a different development of the present invention, a magnetic encoder equipped with a multipolar magnet other than the multipolar magnet 14 can also be employed. The magnetic encoder equipped with the multipolar magnet other than the multipolar magnet 14 is effective to resolve the problem associated with the increase of the width of the conventional magnetic encoder 50 previously described with reference to FIGS. 17A and 17B.

Then, in order to provide a magnetic encoder which can be structured in a compact size and in which a multipolar magnet can be easily magnetized, the magnetic encoder equipped with the multipolar magnet other than the multipolar magnet 14 has one of the following structural features (1) to (3). Also, a wheel support bearing assembly having the following structural feature (4) or (5) is suggested:

(1) In a magnetic encoder including an annular multipolar magnet having a plurality of alternating opposite magnetic poles developed in a direction circumferentially thereof and an annular core metal for supporting the multipolar magnet, the core metal is of a shape including a cylindrical wall and a radial upright wall extending radially outwardly from one end of the cylindrical wall and the multipolar magnet is positioned on one of opposite surfaces of the radial upright wall adjacent the cylindrical wall.

(2) In the structural feature (1) discussed above, the multipolar magnet is magnetized over the entire circumference thereof without being secured to the core metal.

(3) In the structural feature (1) discussed above, the multipolar magnet is magnetized by one-shot magnetization process.

(4) A wheel support bearing assembly is equipped with one of the magnetic encoders having the respective structural features (1) to (3).

(5) In a wheel support bearing assembly for rotatably supporting a wheel relative to a vehicle body structure including an outer member having an inner peripheral surface formed with a plurality of outer raceways, an inner member having inner raceways so formed therein as to align with the outer raceways, and respective rows of rolling elements interposed between the outer raceways and the inner raceways, the magnetic encoder of a structure as defined in any one of the structural features (1) to (3) is mounted on an outer periphery of an inboard end of the inner member through the cylindrical wall of the core metal, with the multipolar magnet oriented towards an inboard side.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A magnetic encoder comprising:
    a ring-shaped multipolar magnet having a plurality of opposite magnetic poles alternating with each other in a direction circumferentially thereof,
    a core metal to support the multipolar magnet,
    wherein the multipolar magnet is prepared from a sintered element that is formed by molding under pressure a powdery mixture of a powdery magnetic material and a binder containing a powdery non-magnetic metallic material to provide a green compact and then sintering the green compact to form the sintered element, and
    the binder has a particle size smaller than 40 μm
    and the sintered element has a density not smaller than 6.6 g/cm$^3$.

2. The magnetic encoder as claimed in claim 1, wherein the particle size of the binder is not greater than 20 μm.

3. The magnetic encoder as claimed in claim 1, wherein the mixing ratio of the powdery magnetic material relative to the binder is within the range of 55:45 to 80:20.

4. The magnetic encoder as claimed in claim 3, wherein the mixing ratio of the powdery magnetic material relative to the binder is substantially 70:30.

5. The magnetic encoder as claimed in claim 1, wherein an air gap x (mm) relative to a surface of the multipolar magnet is equal to or larger than 0.5, and a relation between the air gap x and the magnetic flux density y (mT) of the multipolar magnet satisfies the formula $210\ e^{-1.5x} < y < 320\ e^{-1.5x}$.

6. The magnetic encoder as claimed in claim 1, further comprising a rust preventive coating formed over an entire surface of the magnetic encoder by means of a cationic coating technique, the rust preventive coating having a film thickness within the range of 15 to 35 μm.

7. A wheel support bearing assembly equipped with the magnetic encoder as defined in claim 1.

8. The wheel support bearing assembly as claimed in claim 7, which is for rotatably supporting a vehicle wheel relative to a vehicle body structure, comprising:
    an outer member having an inner peripheral surface formed with a plurality of outer raceways;
    an inner member having inner raceways so formed therein as to align with the outer raceways;
    respective rows of rolling elements interposed between the outer raceways and the inner raceways;
    a sealing unit operable to seal an annular bearing space delimited between the outer member and the inner member and including a generally L-sectioned first sealing plate, mounted on one of the outer and inner members which serves as a rotatable member, and a generally L-sectioned second sealing plate, mounted on the other of the outer and inner members, which serves as a stationary member, in cooperative relation with the first sealing plate;
    an elastic member fitted to the second sealing plate and having a plurality of sealing lips slidingly engageable with the first sealing plate,
    wherein the first sealing plate forms the core metal of the magnetic encoder, and
    wherein the core metal has a radial upright wall on which the multipolar magnet is disposed in overlapped relation therewith.

9. The magnetic encoder as claimed in claim 1, wherein the core metal is of a shape including a cylindrical wall and a radial upright wall extending radially outwardly from one end of the cylindrical wall and the multipolar magnet is positioned on one of opposite surfaces of the radial upright wall adjacent the cylindrical wall.

10. The magnetic encoder as claimed in claim 9, wherein the multipolar magnet is magnetized over the entire circumference thereof while the multipolar magnet has not yet been secured to the core metal.

11. The magnetic encoder as claimed in claim 10, wherein the multipolar magnet is magnetized by a one-shot magnetization process, in which the multipolar magnet is magnetized all at a time over the entire surface thereof.

12. A wheel support bearing assembly equipped with the magnetic encoder as recited in claim 9.

13. A wheel support bearing assembly for rotatably supporting a wheel relative to a vehicle body structure comprising:
    an outer member having an inner peripheral surface formed with a plurality of outer raceways;
    an inner member having inner raceways so formed therein as to align with the outer raceways; and
    respective rows of rolling elements interposed between the outer raceways and the inner raceways,
    wherein the magnetic encoder as recited in claim 10 is mounted on an outer periphery of an inboard end of the inner member through the cylindrical wall of the core metal, such that the multipolar magnet positioned on the radial upright wall of the core metal is oriented towards an inboard side.

* * * * *